(12) United States Patent
Feaver et al.

(10) Patent No.: US 7,238,332 B2
(45) Date of Patent: Jul. 3, 2007

(54) MATERIAL AND PROCESS FOR THE FILTRATION OF NITRIC ACID AND $NO_2$ FROM STREAMS OF AIR

(76) Inventors: William B. Feaver, 1471 Brookforest Dr., Columbus, OH (US) 43204; Christopher J. Karwacki, 713 Priestford Rd., Churchville, MD (US) 21028; Joseph A. Rossin, 1308 Deerlick Dr., Columbus, OH (US) 43228

( * ) Notice: Subject to any disclaimer, the term of this patent is extended or adjusted under 35 U.S.C. 154(b) by 564 days.

(21) Appl. No.: 10/867,102

(22) Filed: Jun. 14, 2004

(65) Prior Publication Data

US 2005/0276738 A1    Dec. 15, 2005

(51) Int. Cl.
*B01D 37/00* (2006.01)
*B01D 53/00* (2006.01)

(52) U.S. Cl. ............... 423/210; 423/239.1; 423/239.2; 95/129; 95/214; 95/273

(58) Field of Classification Search ............... 423/210, 423/239.1, 239.2; 95/129, 214, 273
See application file for complete search history.

(56) References Cited

U.S. PATENT DOCUMENTS

| | | | | |
|---|---|---|---|---|
| 6,461,578 | B1 | 10/2002 | Elomari | 423/213.2 |
| 6,461,580 | B1 | 10/2002 | Elomari | 423/239.2 |
| 6,912,847 | B2 * | 7/2005 | Deeba | 60/297 |
| 2001/0043896 | A1 * | 11/2001 | Domesle et al. | 423/213.5 |

FOREIGN PATENT DOCUMENTS

JP        3-86213 A  *  4/1991

* cited by examiner

*Primary Examiner*—Timothy C. Vanoy
(74) *Attorney, Agent, or Firm*—Baker Botts L.L.P.

(57) ABSTRACT

A material for filtering $NO_2$ and nitric acid vapors from air over a wide range of humidities and temperatures including a porous hydrophobic substrate and an amine is provided.

11 Claims, No Drawings

MATERIAL AND PROCESS FOR THE FILTRATION OF NITRIC ACID AND NO$_2$ FROM STREAMS OF AIR

TECHNICAL FIELD OF THE INVENTION

The present invention relates in general to the field of reducing environmentally harmful air pollutants and more specifically to a novel material and process for filtering nitric acid vapors and NO$_2$ from streams of air.

BACKGROUND OF THE INVENTION

Both nitric acid vapors and NO$_2$ are highly toxic. The US Department of Labor Occupational Safety and Health Administration (OSHA) has set stringent guidelines aimed at protecting workers performing operations in an environment potentially contaminated with both fuming nitric acid/nitric acid vapors and NO$_2$. The Permissible Exposure Limit (PEL) for NO$_2$ has been established at 10 mg/m$^3$ (approximately 5 ppm). The Permissible Exposure Limit (PEL) for fuming nitric acid/nitric acid vapors has been established at 5.2 mg/m$^3$ (approximately 2 ppm).

Impregnated, activated carbon is known to strongly adsorb a wide variety of toxic vapors from ambient air streams. Impregnated, activated carbon does not, however, effectively filter nitric acid vapors and NO$_2$ from ambient air streams. In the case of NO$_2$, there is no mechanism associated with impregnated activated carbon capable of removing NO$_2$. NO$_2$ will, however, react with the surface of carbon to yield NO, which rapidly elutes from the carbon bed. NO, like NO$_2$ is toxic. The PEL for NO has been established at 30 mg/m$^3$ (approximately 25 ppm). Being acidic, one would expect nitric acid vapors to be removed by impregnated activated carbon, such as those employed in military gas mask filters. Nitric acid vapors; however, are not removed by these filters because nitric acid vapors react with the surface of activated carbon to yield NO, which is toxic (PEL for NO has been established at 30 mg/m$^3$, approximately 25 ppm).

Filtration media capable of removing NO$_2$ from streams of air is limited. Gooray et al. (U.S. Pat. No. 4,680,040) describe the use of alkali metal silicates, specifically sodium silicate, lithium silicate and potassium silicate, to adsorb NO$_2$. The reaction is believed to involve the cation of the alkali metal silicate combining with NO$_2$ to form an alkali metal nitrate. Although data demonstrates this material to be effective in filtering low NO$_2$ concentrations (up to about 10 mg/m$^3$), the material does not appear to be able to filter high concentrations of NO$_2$ (1,000 mg/m$^3$).

Onitsuka et al. (U.S. Pat. No. 5,158,582) describe the use of copper salts (CuCl, CuCl$_2$, CuCl$_2$.[NH$_4$Cl]$_2$) impregnated into zeolites to filter NO$_x$ (mixtures of NO and NO$_2$). The copper impregnated zeolites are used to remove low levels of NO$_x$ (about 10 mg/m$^3$) present in highway tunnels (from automotive exhaust). Up to 140 minutes of service life is reported for 10 mg/m$^3$ challenge and 1 mg/m$^3$ breakthrough. The patent notes that humidity in the air greatly reduces the performance of the material, and the process described within the patent consists of an air drier up-stream of the NO$_x$ adsorber.

Ichiki et al. (U.S. Pat. No. 5,840,649) describe the use of a Mn doped TiO$_2$ impregnated with either Ru or Cu oxide, plus Ag, Cu or additional Mn. The material is reported to be useful in treating low levels (about 10 mg/m$^3$) of NO$_x$ from moist air streams.

Amines are known to interact with NO$_2$. A possible reaction between amines and NO$_2$ has been reported by Diaf et al. (*J. Appd. Polymer Sci.* 53 (1994) 857) and Gaden (AIChE Symposium Series No. 309 (1995) 49–60). This reaction is presented below:

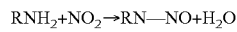

However, under conditions of high relative humidity, the amine-NO$_2$ reaction is minimized because pores of many adsorbents, such as carbon, become saturated with water. For toxic vapors such as NO$_2$ that are not highly soluble in water, the presence of water in the pores of the adsorbent greatly decreases the performance of the filtration media.

Therefore, none of these previous solutions provide an effective, low cost means of removing both nitric acid vapors and NO$_2$ from ambient stream of air under varying temperatures and humidities.

SUMMARY OF THE INVENTION

The present invention is, according to an embodiment, directed to a material for filtering NO$_2$ and nitric acid vapors from air over a wide range of humidities and temperatures includes a porous hydrophobic substrate and an amine. The porous hydrophobic substrate includes zeolites from the pentisil family. In one embodiment of the present invention, the zeolite is ZSM-5. In other embodiments the porous hydrophobic substrate may include ZSM-8, ZSM-11, and acidified forms of zeolites of the pentisil family. The amine may include a primary amine, a secondary amine, an amine possessing both a primary and secondary amine, and mixtures thereof. The amine may also include amine salts and amines with at least one R—NHCH$_3$ functional group. According to one embodiment, the material includes from about 0.001% to about 20% by weight amine.

According to another embodiment of the present invention, a process for filtering NO$_2$ and nitric acid over a wide range of humidities and temperatures includes providing an amine impregnated porous hydrophobic substrate and an air stream and contacting the air stream with the amine impregnated porous hydrophobic substrate. The process may operate under relative humidities from 0% to 90% and temperatures from 0° F. to 120° F.

DETAILED DESCRIPTION OF THE INVENTION

The present invention, according to certain embodiments, relates to a novel material and the use of the novel material in a novel process for removing NO$_2$ and nitric acid vapors from ambient air streams over a wide relative humidity (RH) range, from less than about 10% RH to greater than about 80% RH over a temperature of about 75° F.±about 50° F.

The novel material, in one embodiment, includes a porous hydrophobic substrate. In another embodiment, the porous hydrophobic substrate is a zeolite from the pentisil family, preferably zeolite ZSM-5. ZSM-5, because of its commercial availability, is the preferred zeolite. ZSM-5 is a high silica zeolite including a series of interconnecting parallel and sinusoidal channels approximately 5.8 Å in diameter. Preparation of ZSM-5 was first reported in U.S. Pat. No. 3,702,886. ZSM-5 is a member of the pentisil family of zeolites that includes zeolitic materials whose structure includes 5-membered rings. Additional common zeolites belonging to the pentisil family include ZSM-8 and ZSM-11. ZSM-5 may be prepared over a range of SiO$_2$/Al$_2$O$_3$ ratios, from greater than about 10,000 to less than about 20.

Because of its high silica content and small pores, ZSM-5 is hydrophobic, adsorbing a relatively small amount of water under high relative humidity conditions.

ZSM-5 crystals are synthesized in the sodium form and can be used as prepared, provided the as-synthesized zeolite is calcined to remove the organic templating agent. Alternatively, ZSM-5 can be cation exchanged to a variety of forms, such as H—, Ca—, K—, etc., following procedures known to one skilled in the art.

The pores of the porous hydrophobic substrate may be impregnated with either a primary or secondary amine, or mixture thereof, or a compound containing both a primary and secondary amine functional group, for example diethylenetriamine. According to one embodiment of the present invention, the amine is a primary amine, possessing an $H_2N$—R functional group. According to another embodiment, the amine is a secondary amine, preferably possessing at least one $H_3C$—NH—R functional group.

The amine loading will have a significant impact on the performance of the resulting material. Based on the desired performance for the material, the amine loading can vary over a wide range, from as little as about 0.01% by weight to as much as about 20% by weight. In one embodiment, the amine loading may range from about 0.01% to about 5% by weight. In another embodiment, the amine loading may range from about 5% to about 10% by weight. In yet another embodiment, the amine loading may range from about 10% to about 15% by weight. In another embodiment, the amine loading may range from about 15% to about 20% by weight. For optimum performance, the preferred amine loading is from about 2% to about 12% by weight, with an amine loading from about 5% to about 10% by weight being most preferred.

The novel material described herein involves first preparing particles, beads, spheres, etc., of preferably zeolite ZSM-5 followed by impregnation of the particles with an amine solution. Following impregnation, the amine impregnated zeolite particles are dried to remove excess solution. Zeolite ZSM-5 may be purchased from commercial sources. Alternatively, zeolite ZSM-5 may be synthesized using techniques known to one skilled in the art (see for example U.S. Pat. No. 3,702,886). As prepared, ZSM-5 is a powder consisting of crystals typically less than about 50 µm in length. As-synthesized ZSM-5 is generally neutral or mildly basic. Zeolite ZSM-5 may be employed in the acidified form, such as ion exchange with ammonium salts (e.g. ammonium chloride) followed by calcinations.

Zeolites of the pentisil family, such as ZSM-5, can often be prepared over a wide range of $SiO_2/Al_2O_3$ ratios, from as low as about 20 to greater than about 10,000. However, the preferred $SiO_2/Al_2O_3$ ratio is between about 50 and 500, with a $SiO_2/Al_2O_3$ ratio between about 75 and about 120 being more preferred.

As-synthesized zeolite of the pentisil family, such as ZSM-5, exists as small crystals and must therefore be configured in the form of particles, rings, cylinders, spheres, etc. in order to be effectively employed in the process described herein. Alternatively, pentisil zeolite such as ZSM-5 may be configured as a monolith, or coated onto the walls of a ceramic material, for example honeycomb corderite. Failure to configure pentisil zeolite crystals, such as ZSM-5 crystals, as described above may result in excessive pressure drop across the filtration media. Configuring the zeolite crystals into various geometrical shapes can be performed using techniques well known to one skilled in the art. These techniques include pilling, extruding, etc. Binders, for example clays, silicates, plastics, etc., may or may not be required for the given process; however, the use of binders in the formation of zeolite particles, spheres, etc, is preferred.

The acidified forms of other zeolites of the pentisil family, for example H-ZSM-8 and H-ZSM-11. are also hydrophobic and therefore are expected to function as a filtration media as per the present invention. However, ZSM-5 is the preferred filtration media.

Amine impregnation of pentisil zeolite particles, such as ZSM-5, are accomplished using techniques well known to one skilled in the art, for example incipient wetness. Impregnation involves adding the desired amount of primary or secondary amine, or mixtures thereof, to a solvent, such as water. The amine-laden solvent is then contacted with the ZSM-5 particles. Following contact, it is desired that the particles be treated, for example by drying at an elevated temperature, in order to remove the solvent.

Alternatively, primary or secondary amine, or mixtures thereof, can be added to the ZSM-5 particles by evaporative techniques. For example, zeolite can be added to a rotating blender, and the amine can be slowly added to the blender while mixing.

According to one embodiment of the novel process described herein, ambient air laden with either nitric acid vapors, $NO_2$ or mixtures thereof, is passed through an amine impregnated hydrophobic substrate. The novel material employed in the process may include ZSM-5, ZSM-8, or other members of the pentisil zeolite family, impregnated with small amounts of primary amine or secondary amine, or mixtures thereof. Examples of secondary amines include 1,3 dimethylurea ($CH_3NHCONHCH_3$) and N,N' dimethylethylenediamine ($CH_3NHC_2H_4NHCH_3$). Examples of primary amines include 1-3 diaminopropane ($NH_2C_3H_6NH_2$) and urea ($H_2NCONH_2$). In addition, the amine impregnant may include a compound possessing both primary and secondary amine functionalities, for example diethylenetriamine ($H_2N$—$C_2H_4$—NH—$C_2H_4$—$NH_2$). Amines may also include amine salts and amines with at least one R—$NHCH_3$ functional group.

According to one embodiment of the present invention, the process includes the use of a porous hydrophobic substrate, such as ZSM-5, into which the reactive amine or mixture thereof are impregnated. Depending on the environment and environmental conditions, the water content associated with ambient air may vary over a wide range, from about 0% to greater than about 90% relative humidity (RH). In one embodiment, the process occurs in conditions from about 0% RH to about 18% RH. In another embodiment the process occurs in conditions from about 18% RH to about 36% RH. In yet another embodiment the process occurs in conditions from about 36% RH to about 54% RH. In one embodiment, the process occurs in conditions from about 54% RH to about 72% RH. In another embodiment, the process occurs in conditions from about 72% RH to about 90% RH. Zeolite ZSM-5, and other members of the pentisil zeolite family, is hydrophobic in nature, adsorbing only small amounts of water from ambient air streams under conditions of high relative humidity. As a result, under conditions of high relative humidity, ambient moisture is not significantly adsorbed and therefore does not significantly reduce the ability of the amine impregnated zeolite to filter $NO_2$ and nitric acid vapors.

Another embodiment of the present invention allows the process to operate under a range of temperatures. In one embodiment the process occurs in temperatures from about 0° F. to about 25° F. In another embodiment, the process in temperatures from about 25° F. to about 50° F. In yet another embodiment the process occurs in temperatures from about 50° F. to about 75° F. In one embodiment the process occurs in temperatures from about 75° F. to about 100° F. In another embodiment, the process in temperatures from about 100° F. to about 125° F.

According to one embodiment of the novel process described herein, the ambient air stream containing $NO_2$, nitric acid vapors, or mixtures thereof, is passed through a filtration device in a manner that allows for contacting the contaminated process stream with the novel filtration material, preferably zeolite ZSM-5 impregnated with a secondary amine possessing at least one $H_3C$—NH—R functional group. $NO_2$ and nitric acid vapors are removed from the ambient air stream via interaction with amine located within the pores of the zeolite. The filtration device employing preferably amine impregnated zeolite ZSM-5 can take on many shapes and geometric forms depending upon the application, so long as the filtration device promotes contact between the stream being treated and the filtration media. The linear velocity by which the contaminated process stream passes through the filter bed containing preferably amine impregnated zeolite ZSM-5 will be a function of the many parameters, for example the bed depth, the ambient concentration of $NO_2$, nitric acid vapors, or mixtures thereof, and the desired protection (breakthrough time) one wishes to achieve. Examples of filtration devices include, for example, gas mask canisters, respirators, filter banks such as those employed in fume hoods, ventilation systems, etc. A blower motor, fan, etc. may be used as a means of forcing ambient air through the filtration device, if desired.

According to another embodiment of the novel process described herein is expected to also remove additional acid gases, for example $Cl_2$, HCl, HF, etc., from an ambient air stream, as the basic amine impregnant(s) are expected to remove acid gases via acid-base reaction chemistry.

The novel material and novel process described herein may be applied to many forms and configurations that facilitate the contact between the novel filtration material described herein and a contaminated vapor stream. Examples include gas masks, fume hood ventilation filters, cartridge filters, etc. It is necessary, however, that the zeolite impregnated with either a primary or secondary amine, or mixture thereof, be configured within the filtration apparatus in a manner such that the stream containing either nitric acid vapors, $NO_2$, or mixtures thereof is brought into contact with the novel filtration material.

Test Description: Laboratory scale tests were performed to evaluate the ability of the filtration media to remove $NO_2$ and nitric acid vapors from ambient air streams. A description of the laboratory scale test stand follows: A stream of compressed air delivered from a mass flow controller is delivered to a water sparger located within a temperature controlled water bath. A second stream of compressed, dry air (dew point temperature less than minus 20° F.) is delivered from a second mass flow controller and is blended with the humid air stream from the water sparger. The water content of the air stream is controlled by controlling flow rates of the two process streams. An $NO_2$/air mixture (approximately 5% $NO_2$ in air) is delivered to the process stream at a junction downstream of the water sparger using a mass flow controller. The resulting $NO_2$/air stream of varying water content is delivered to the filtration test assembly. The filtration test assembly includes a glass tube fitted with a small mesh screen sufficient to support the bed of filtration material. A portion of the effluent stream is delivered to a chemiluminescence NO—$NO_x$ analyzer.

When performing test with nitric acid vapors, the nitric acid vapors were delivered to the process stream by passing a dry air stream through a sparger cell containing nitric acid. The concentration of nitric acid vapors were determined by passing the effluent stream through a bed of platinum catalyst at approximately 500° C. The catalyst converted the nitric acid vapors to $NO_x$, thereby allowing the feed and effluent streams to be analyzed using an NO—$NO_x$ analyzer.

When performing tests under conditions of high RH, the filtration media was pre-humidified overnight in an environmental chamber at 80° F., 80% RH. All tests were performed at 80° F. at either less than 5% RH or 80% RH. All $NO_2$ breakthrough times are reported corresponding to an effluent $NO_2$ concentration of 10 mg/m$^3$, or an effluent NO concentration of 30 mg/m$^3$. All breakthrough times for nitric acid vapors are reported corresponding to an $NO_x$ equivalent concentration of 5 ppm.

EXAMPLE I (COMPARATIVE)

ASZM-TEDA carbon having a surface area of approximately 900 m$^2$/g was obtained from Calgon Carbon Corporation (Pittsburgh, Pa.) as 20×40 mesh granules. 7.5 cm$^3$ of carbon granules were placed within the test cell so as to produce a bed with the depth of 1.0 cm. The bed was exposed to a process stream containing 200 mg/m$^3$ $NO_2$ and flowing at a linear velocity of 6.0 cm/s. The RH of the process stream was less than 5%, and the temperature of the process stream was maintained at 80° F. (27° C.). Breakthrough, as NO, occurred in less than 3 minutes. Breakthrough occurred as NO because $NO_2$ oxidized the surface of the carbon granules, reducing $NO_2$ to NO.

20×40 mesh ASZM-TEDA carbon granules were pre-humidified at 80° F. (27° C.), 80% RH overnight. The pre-humidified carbon granules were then evaluated for their ability to filter $NO_2$ as described above, with the exception that the RH of the process stream was 80%. Breakthrough, as NO, occurred in less than 3 minutes.

The above example demonstrates that impregnated, activated carbon is unable to filter $NO_2$.

EXAMPLE II (COMPARATIVE)

ASZM-TEDA carbon having a surface area of approximately 900 m$^2$/g was obtained from Calgon Carbon Corporation (Pittsburgh, Pa.) as 20×40 mesh granules. 7.5 cm$^3$ of carbon granules were placed within the test cell so as to produce a bed with the depth of 1.0 cm. The bed was exposed to a process stream containing 1,000 mg/m$^3$ nitric acid vapors and flowing at a linear velocity of 6.0 cm/s. The RH of the process stream was less than 5%, and the temperature of the process stream was maintained at 80° F. (27° C). Breakthrough, as NO, occurred in less than 3 minutes. Breakthrough occurred as NO due to the nitric acid vapors oxidizing the surface of the carbon granules.

The above example demonstrates that impregnated, activated carbon is unable to filter nitric acid vapors.

EXAMPLE III 400 g of ZSM-5 crystals with a $SiO_2/Al_2O_3$ ratio of 120 were added to a glass pan. To the zeolite crystals were added 300 g of colloidal silica solution (40% $SiO_2$) and 10 g of a 20% zirconia oxynitrate solution. The resulting paste was mixed to a uniform consistency. The resulting paste was placed in a forced convection oven overnight at 80° C. Once dry, the solid material was placed in a furnace and calcined by heating to 450° C. in two hours, with the 450° C. temperature maintained for 2 hours. The resulting material was allowed to cool, then crushed and sieved to 12×30 mesh granules.

A solution prepared by adding 3.5 g of diethylenetriamine (DETA) to 26.5 g of water was used to impregnate 30 g of the 12×30 mesh ZSM-5 granules using incipient wetness techniques. Following impregnation, the resulting particles were placed in an oven at 80° C. overnight in order to remove the water. Following drying, the resulting material was determined to be 11% DETA.

EXAMPLE IV

The 12×30 mesh 11% DETA/ZSM-5 particles as described in Example III were evaluated for their ability to remove $NO_2$ from streams of dry and humid air. 15 $cm^3$ of DETA/ZSM-5 particles were placed in a 3.1 cm diameter jacketed glass tube, resulting in a 2.0 cm deep bed of 12×30 mesh particles. The particles were exposed to a feed stream consisting of 1,000 $mg/m^3$ $NO_2$ in dry air (RH<10%) flowing at a linear velocity of 6.0 cm/s. The $NO_2$ breakthrough time (to 10 $mg/m^3$) was 102 minutes.

EXAMPLE V

15 $cm^3$ of the 12×30 mesh 11% DETA/ZSM-5 particles as described in Example III were placed in an environmental chamber at 80° F., 80% RH overnight in order to pre-humidify the material. 15 $cm^3$ of pre-humidified DETA/ZSM-5 particles were placed in a 3.1 cm diameter jacketed glass tube, resulting in a 2.0 cm deep bed of 12×30 mesh particles. The particles were exposed to a feed stream consisting of 1,000 $mg/m^3$ $NO_2$ in dry air (RH=80%) flowing at a linear velocity of 6.0 cm/s. The $NO_2$ breakthrough time (to 10 $mg/m^3$) was 67 minutes.

EXAMPLE VI 3,030 g of ZSM-5 crystals with a $SiO_2/Al_2O_3$ ratio of 90 were added to a plastic pail. To the zeolite crystals were added 3,409 g of 20% zirconia oxynitrate solution, 341 g of colloidal silica solution (40% $SiO_2$) and 129 g of pseudo-boehmite. The resulting dough was blended using an overhead mixer to a uniform consistency. Once mixed, the resulting dough was placed in a forced convection oven overnight at 80° C. The resulting solid material was placed in a furnace and calcined by heating to 525° C. in five hours, with the 525° C. temperature maintained for 4 hours. The resulting material was allowed to cool, then crushed and sieved to 12×30 mesh granules.

A solution prepared by adding 4.0 g of urea to 36 g of water was used to impregnate 50 g of the 12×30 mesh ZSM-5 granules using incipient wetness techniques. Following impregnation, the resulting particles were placed in an oven at 80° C. overnight in order to remove the water. Following drying, the resulting material was determined to be 8% urea.

A solution prepared by adding 0.6 g of urea to 38 g of water was used to impregnate 50 g of the 12×30 mesh ZSM-5 granules using incipient wetness techniques. Following impregnation, the resulting particles were placed in an oven at 80° C. overnight in order to remove the water. Following drying, the resulting material was determined to be 1.3% urea.

EXAMPLE VII

The 12×30 mesh 8% urea/ZSM-5 particles as described I Example VI were evaluated for their ability to remove $NO_2$ from streams of dry and humid air. 15 $cm^3$ of urea/ZSM-5 particles were placed in a 3.1 cm diameter jacketed glass tube, resulting in a 2.0 cm deep bed of 12×30 mesh particles. The particles were exposed to a feed stream consisting of 1,000 $mg/m^3$ $NO_2$ in dry air (RH<10%) flowing at a linear velocity of 9.6 cm/s. The $NO_2$ breakthrough time (to 10 $mg/m^3$) was 110 minutes.

The 12×30 mesh 1.3% urea/ZSM-5 particles as described in Example VI were evaluated for their ability to remove $NO_2$ from streams of dry and humid air. 15 $cm^3$ of urea/ZSM-5 particles were placed in a 3.1 cm diameter jacketed glass tube, resulting in a 2.0 cm deep bed of 12×30 mesh particles. The particles were exposed to a feed stream consisting of 1,000 $mg/m^3$ $NO_2$ in dry air (RH<10%) flowing at a linear velocity of 9.6 cm/s. The $NO_2$ breakthrough time (to 10 $mg/m^3$) was 44 minutes.

EXAMPLE VIII 7.5 $cm^3$ of 20×50 mesh 11% DETA/ZSM-5 granules prepared according to the procedure described in Example III were placed in a in a 3.1 cm diameter jacketed glass tube, resulting in a 1.0 cm deep bed. The particles were exposed to a feed stream consisting of 1,000 $mg/m^3$ $HNO_3$ vapors in dry air (RH<10%) flowing at a linear velocity of 6.0 cm/s. The $HNO_3$ breakthrough time (to 5.2 $mg/m^3$) was 99 minutes.

EXAMPLE IX 7.5 $cm^3$ of 20×50 mesh 11% DETA/ZSM-5 granules prepared according to the procedure described in Example III were pre-humidified overnight in an environmental chamber at 80° F., 80% RH. The weight gain upon humidification was 8%. In the morning, the pre-humidified material was placed in a in a 3.1 cm diameter jacketed glass tube, resulting in a 1.0 cm deep bed. The particles were exposed to a feed stream consisting of 1,000 $mg/m^3$ nitric acid vapors in humid air (RH=50%) flowing at a linear velocity of 6.0 cm/s. The $HNO_3$ breakthrough time (to 5.2 $mg/m^3$) was 93 minutes.

EXAMPLE X 500 g of ZSM-5 crystals with a $SiO_2/Al_2O_3$ ratio of 90 were added to a mixing bowl. To the zeolite crystals were added 563 g of 20% zirconia oxynitrate solution, 56 g of colloidal silica solution (40% $SiO_2$) and 24.1 g of pseudo-boehmite. The resulting dough was blended using an overhead mixer to a uniform consistency. Once mixed, the resulting dough was placed in a forced convection oven overnight at 70° C. The resulting solid material was placed in a furnace and calcined by heating to 550° C. in 2.5 hours, with the 550° C. temperature maintained for 4 hours. The resulting material was allowed to cool, then crushed and sieved to 12×30 mesh granules.

A solution prepared by adding 1.5 g of N,N' dimethylethylenediamine to 24 g of DI water was used to impregnate 30 g of the 12×30 mesh ZSM-5 granules using incipient wetness techniques. Following impregnation, the resulting particles were placed in an oven at 80° C. overnight in order to remove the water. Following drying, the resulting material was determined to be 4% N,N' dimethylethylenediamine by weight.

EXAMPLE XI

The 12×30 mesh 4% N,N' dimethylethylenediamine/ZSM-5 particles in Example X were evaluated for their ability to remove $NO_2$ from streams of dry and humid air. 15 cm³ of N,N' dimethylethylenediamine/ZSM-5 particles were placed in a 3.1 cm diameter jacketed glass tube, resulting in a 2.0 cm deep bed of 12×30 mesh particles. The particles were exposed to a feed stream consisting of 1,000 mg/m³ $NO_2$ in dry air (RH<10%) flowing at a linear velocity of 9.6 cm/s. The $NO_2$ breakthrough time (to 10 mg/m³) was 95 minutes.

15 cm³ of 12×30 mesh N,N' dimethylethylenediamine/ZSM-5 particles (Example X) were pre-humidified overnight at 80° F., 80% RH. The weight gain resulting from moisture pick-up was 7%. The pre-humidified particles placed in a 3.1 cm diameter jacketed glass tube, resulting in a 2.0 cm deep bed. The particles were exposed to a feed stream consisting of 1,000 mg/m³ $NO_2$ in humid air (RH=80%) flowing at a linear velocity of 9.6 cm/s. Under humid test conditions, breakthrough occurred as NO, rather than $NO_2$. The NO breakthrough time (to 30 mg/m³) was 54 minutes.

EXAMPLE XII 500 g of ZSM-5 crystals with a $SiO_2/Al_2O_3$ ratio of 90 were added to a mixing bowl. To the zeolite crystals were added 563 g of 20% zirconia oxynitrate solution, 56 g of colloidal silica solution (40% $SiO_2$) and 24.1 g of pseduo-boehmite. The resulting dough was blended using an overhead mixer to a uniform consistency. Once mixed, the resulting dough was placed in a forced convection oven overnight at 70° C. The resulting solid material was placed in a furnace and calcined by heating to 550° C. in 2.5 hours, with the 550° C. temperature maintained for 4 hours. The resulting material was allowed to cool, then crushed and sieved to 12×30 mesh granules.

An aqueous amine solution was prepared by adding 3.0 g of 1,3 dimethyl urea to 25 g of DI water. The resulting solution was used to impregnate 30 g of the 12×30 mesh ZSM-5 granules using incipient wetness techniques. Following impregnation, the resulting particles were placed in an oven at 80° C. overnight in order to remove the water. Following drying, the resulting material was determined to be 8% 1,3 dimethyl urea by weight.

EXAMPLE XIII

The 12×30 mesh 8% dimethyl urea/ZSM-5 particles in Example XII were evaluated for their ability to remove $NO_2$ from streams of dry and humid air. 15 cm³ of dimethyl urea/ZSM-5 particles were placed in a 3.1 cm diameter jacketed glass tube, resulting in a 2.0 cm deep bed of 12×30 mesh particles. The particles were exposed to a feed stream consisting of 1,000 mg/m³ $NO_2$ in dry air (RH<10%) flowing at a linear velocity of 9.6 cm/s. The $NO_2$ breakthrough time (to 10 mg/m³) was 61 minutes.

An additional 15 cm³ of 12×30 mesh 8% dimethyl urea/ZSM-5 particles (Example XII) were pre-humidified overnight at 80° F., 80% RH. The weight gain resulting from moisture pick-up was 7%. The pre-humidified particles placed in a 3.1 cm diameter jacketed glass tube, resulting in a 2.0 cm deep bed. The particles were exposed to a feed stream consisting of 1,000 mg/m³ $NO_2$ in humid air (RH=80%) flowing at a linear velocity of 9.6 cm/s. Under humid test conditions, breakthrough occurred as NO, rather than $NO_2$. The NO breakthrough time (to 30 mg/m³) was 91 minutes.

EXAMPLE XIV 500 g of ZSM-5 crystals with a $SiO_2/Al_2O_3$ ratio of 90 were added to a mixing bowl. To the zeolite crystals were added 563 g of 20% zirconia oxynitrate solution, 56 g of colloidal silica solution (40% $SiO_2$) and 24.1 g of pseduo-boehmite. The resulting dough was blended using an overhead mixer to a uniform consistency. Once mixed, the resulting dough was placed in a forced convection oven overnight at 70° C. The resulting solid material was placed in a furnace and calcined by heating to 550° C. in 2.5 hours, with the 550° C. temperature maintained for 4 hours. The resulting material was allowed to cool, then crushed and sieved to 12×30 mesh granules.

An aqueous amine solution was prepared by adding 3.0 g of ethylamine.HCl to 23 g of DI water. The resulting solution was used to impregnate 30 g of the 12×30 mesh ZSM-5 granules using incipient wetness techniques. Following impregnation, the resulting particles were placed in an oven at 80° C. overnight in order to remove the water. Following drying, the resulting material was determined to be 9% ethylamine.HCl by weight.

EXAMPLE XV

The 12×30 mesh 9% ethylamine.HCl/ZSM-5 particles in Example XIV were evaluated for their ability to remove $NO_2$ from streams of dry and humid air. 15 cm³ of 9% ethylamine.HCl/ZSM-5 particles were placed in a 3.1 cm diameter jacketed glass tube, resulting in a 2.0 cm deep bed of 12×30 mesh particles. The particles were exposed to a feed stream consisting of 1,000 mg/m³ $NO_2$ in dry air (RH<10%) flowing at a linear velocity of 9.6 cm/s. The $NO_2$ breakthrough time (to 10 mg/m³) was 27 minutes.

An additional 15 cm³ of 12×30 mesh 9% ethylamine.HCl/ZSM-5 particles (Example XIV) were pre-humidified overnight at 80° F., 80% RH. The weight gain resulting from moisture pick-up was 14%. The pre-humidified particles placed in a 3.1 cm diameter jacketed glass tube, resulting in a 2.0 cm deep bed. The particles were exposed to a feed stream consisting of 1,000 mg/m³ $NO_2$ in humid air (RH=80%) flowing at a linear velocity of 9.6 cm/s. Under humid test conditions, breakthrough occurred as NO, rather than $NO_2$. No $NO_2$ was detected in the effluent stream during the test. The concentration of NO in the effluent stream increased to 50 mg/m³ following 1 minute, then decreased to less than 30 mg/m³ following 5 minutes of exposure. The effluent concentration of NO did not exceed 30 mg/m³ until 56 minutes.

EXAMPLE XVI 500 g of ZSM-5 crystals with a $SiO_2/Al_2O_3$ ratio greater than 500 were added to a mixing bowl. To the zeolite crystals were added 563 g of 20% zirconia oxynitrate solution, 56 g of colloidal silica solution (40% $SiO_2$) and 24.1 g of pseduo-boehmite. The resulting dough was blended using an overhead mixer to a uniform consistency. Once mixed, the resulting dough was placed in a forced convection oven overnight at 70° C. The resulting solid material was placed in a furnace and calcined by heating to 550° C. in 2.5 hours, with the 550° C. temperature maintained for 4 hours. The resulting material was allowed to cool, then crushed and sieved to 12×30 mesh granules.

An aqueous amine solution was prepared by adding 3.0 g of 1,3 dimethyl urea to 25 g of DI water. The resulting solution was used to impregnate 30 g of the 12×30 mesh ZSM-5 granules using incipient wetness techniques. Following impregnation, the resulting particles were placed in an oven at 80° C. overnight in order to remove the water. Following drying, the resulting material was determined to be 8% 1,3 dimethyl urea by weight.

EXAMPLE XVII

The 12×30 mesh 8% dimethyl urea/ZSM-5 particles in Example XVI were evaluated for their ability to remove $NO_2$ from streams of dry. 15 $cm^3$ of 8% dimethyl urea/ZSM-5 particles were placed in a 3.1 cm diameter jacketed glass tube, resulting in a 2.0 cm deep bed of 12×30 mesh particles. The particles were exposed to a feed stream consisting of 1,000 $mg/m^3$ $NO_2$ in dry air (RH<10%) flowing at a linear velocity of 9.6 cm/s. The $NO_2$ breakthrough time (to 10 $mg/m^3$) was 90 minutes.

EXAMPLE XVIII

The 12×30 mesh 8% dimethyl urea/ZSM-5 particles in Example XII are evaluated for their ability to remove $Cl_2$ from streams of dry air. 15 $cm^3$ of dimethyl urea/ZSM-5 particles are placed in a 3.1 cm diameter jacketed glass tube, resulting in a 2.0 cm deep bed of 12×30 mesh particles. The particles are exposed to a feed stream consisting of 1,000 $mg/m^3$ $Cl_2$ in dry air (RH<10%) flowing at a linear velocity of 9.6 cm/s. The $Cl_2$ breakthrough time (to 10 $mg/m^3$) is greater than 60 minutes.

What is claimed is:

1. A process for filtering $NO_2$ and nitric acid vapors from air over wide range of humidities and temperatures comprising: providing an amine impregnated porous hydrophobic substrate and an air stream; and contacting the air stream with the amine impregnated porous hydrophobic substrate.

2. The process of claim 1 wherein the amine impregnated porous hydrophobic substrate comprises a zeolite from the pentisil family containing from about 0.001% to about 20% by weight amine.

3. The process of claim 1 wherein the amine impregnated porous hydrophobic substrate comprises an amine selected from the group consisting of a primary amine, a secondary amine, an amine possessing both a primary and secondary amine functional group and mixtures thereof.

4. The process of claim 1 wherein the amine impregnated porous hydrophobic substrate comprises ZSM-5.

5. The process of claim 1 wherein the amine impregnated porous hydrophobic substrate comprises a zeolite selected from the group consisting of ZSM-5, ZSM-8, ZSM-11 and mixtures thereof.

6. The process of claim 1 wherein said amine is predominantly an amine salt.

7. The process of claim 1 wherein the process operates under conditions from about 0% to about 90% relative humidity.

8. The process of claim 1 wherein the process operates under a temperature from about 0° F. to about 125° F.

9. A process for filtering $NO_2$ and nitric acid vapors from air comprising: providing a zeolite and an air stream, wherein the zeolite is from the pentisil family and comprises from about 0.001% to about 20% by weight an amine selected from the group consisting of a primary amine, a secondary amine, an amine possessing both a primary and secondary amine functional group, and mixtures thereof; and; contacting the air stream with the zeolite.

10. The process of claim 9 the zeolite comprises predominantly ZSM-5.

11. The process of claim 9 the amine comprises predominantly an amine salt.

* * * * *